United States Patent
Dura et al.

(10) Patent No.: US 10,482,324 B2
(45) Date of Patent: Nov. 19, 2019

(54) METHOD FOR ANALYZING A STRUCTURED DOCUMENT LIKELY TO BE DEFORMED

(71) Applicant: IDEMIA IDENTIFY & SECURITY FRANCE, Issy-les Moulineaux (FR)

(72) Inventors: Jeremy Nicolas Laurent Dura, Issy les Moulineaux (FR); Laurent Patrice Rostaing, Issy les Moulineaux (FR); Alain Rouh, Issy les Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 54 days.

(21) Appl. No.: 15/940,908

(22) Filed: Mar. 29, 2018

(65) Prior Publication Data
US 2018/0285639 A1    Oct. 4, 2018

(30) Foreign Application Priority Data

Mar. 30, 2017 (FR) ...................... 17 52725

(51) Int. Cl.
*G06K 9/20* (2006.01)
*G06K 9/00* (2006.01)

(52) U.S. Cl.
CPC ..... *G06K 9/00463* (2013.01); *G06K 9/00483* (2013.01); *G06K 9/2018* (2013.01); *G06K 2009/2045* (2013.01)

(58) Field of Classification Search
CPC combination set(s) only.
See application file for complete search history.

(56) References Cited

U.S. PATENT DOCUMENTS

| 6,606,421 B1* | 8/2003 | Shaked | G06K 5/00 382/275 |
| 8,345,979 B2* | 1/2013 | Davis | G06K 9/6206 382/181 |

(Continued)

FOREIGN PATENT DOCUMENTS

| DE | 102013101587 A1 | 8/2014 |
| FR | 2952218 A1 | 5/2011 |
| WO | 2011/058418 A2 | 5/2011 |

OTHER PUBLICATIONS

Richard Franke, "Scattered Data Interpolation: Tests of Some Method", Mathematics of Computation, vol. 38, No. 157, Jan. 1982, pp. 181-200.

(Continued)

*Primary Examiner* — Tsung Yin Tsai
(74) *Attorney, Agent, or Firm* — Womble Bond Dickinson (US) LLP

(57) ABSTRACT

The invention relates to a method for analyzing a structured document likely to be deformed from a first image and a second image of the document, comprising steps of:
  matching first points of interest extracted in the first image with second points of interest of a reference image showing a model of the document,
  estimation of a first geometric transformation taking account of deformations of the structured document shown in the first image relative to the model from the matches,
  determination of at least one first region to be analyzed in the first image, by projection of at least one reference region of the reference image by means of the first transformation,
  analysis of the content of the first determined region,
  matching third points of interest extracted in the second image with fourth points of interest extracted in the first image, (Continued)

estimation, from the matches made in the preceding step, of a second geometric transformation taking account of deformations of the document shown in the second image relative to the document shown in the first image, estimation of a third geometric transformation taking account of deformations of the document shown in one of the two images, called target image, relative to the first model shown in the reference image, the third transformation dependent on the second transformation, determination of at least one second region to be analyzed in the target image by projection of the reference region of the reference image by means of the third geometric transformation, analysis of the content of the second determined region.

15 Claims, 9 Drawing Sheets

(56) References Cited

U.S. PATENT DOCUMENTS

| 8,965,134 | B2* | 2/2015 | Kompalli | G06K 9/00483 358/537 |
|---|---|---|---|---|
| 9,710,704 | B2* | 7/2017 | Panferov | G06K 9/00463 |
| 9,911,034 | B2* | 3/2018 | Chulinin | G06K 9/00463 |
| 9,922,247 | B2* | 3/2018 | Khintsitskiy | G06K 9/00483 |
| 2005/0078851 | A1 | 4/2005 | Jones et al. | |
| 2009/0016564 | A1* | 1/2009 | Ke | G06K 9/00463 382/100 |
| 2009/0059316 | A1 | 3/2009 | Irwin et al. | |
| 2012/0177291 | A1* | 7/2012 | Gronau | G06K 9/00402 382/190 |
| 2015/0254838 | A1* | 9/2015 | Blumhofer | G16H 30/20 382/131 |
| 2016/0104039 | A1* | 4/2016 | Rouh | G06K 9/00442 382/112 |
| 2016/0350592 | A1* | 12/2016 | Ma | G06K 9/4671 |

OTHER PUBLICATIONS

Preliminary Research Report received for French Application No. 1752725, dated Dec. 7, 2017, 3 pages (1 page of French Translation Cover Sheet and 2 page of original document).

Nakajima et al., "Video Mosaicing for Document Imaging", Proc. Cbdar, Demo Session, Jan. 1, 2007, pp. 171-178.

Kim et al., "Dewarping Book Page Spreads Captured with a Mobile Phone Camera", In: "Network and Parallel Computing", Jan. 1, 2014, vol. 8357, 6 pages.

* cited by examiner

METHOD FOR ANALYZING A STRUCTURED DOCUMENT LIKELY TO BE DEFORMED

FIELD OF THE INVENTION

The present invention relates to a method for analyzing content of a structured document likely to be deformed.

PRIOR ART

A structured document such as an identity document, a game ticket, proof of residency, an invoice, a form, etc., is generally generated on the basis of a model of a document. The structured document comprises predetermined generic information already presented in the model, but also personalized information. For example, in a passport, the name and first name of the holder of the passport constitute personalized information.

It is well known to analyze a structured document by acquisition of an image of such a document and analysis of the content of this image acquired. However, such analysis is made difficult when the analyzed document is deformed, for example crumpled.

Methods such as that described in document FR 2952218 propose considering deformations in the image of a document subjected by means of software and projection of structured light, to determine an image of a virtual document identical to the real document but which would not be deformed. For this, points of interest of a two-dimensional grid projected onto the document are matched with the corresponding points in the crumpled document, and a deformation of the document is computed on the basis of these matches. Such methods however have the disadvantage of requiring the use of a system for projecting the grid.

Similarly, the method proposed in document WO2011/058418 proposes correcting a perspective transformation of an image acquired showing a document to be analyzed. For correcting such a transformation, points of interest extracted in the image acquired are matched with predetermined points of interest of a reference image showing a document model. A homography of the image of the document compatible with these matches of points of interest is then computed. However, it is necessary to predetermine many points of interest in the reference image so that many matches can be made and so that the transformation is corrected precisely. In other words, the method described in document WO2011/058418 needs a high computational load to precisely characterize deformations undergone by the document.

EXPLANATION OF THE INVENTION

An aim of the invention is to analyze a structured document deformed by means of a method requiring no grid projection system, and which is less expensive in computational load relative to methods of the prior art, with equal accuracy.

According to a first aspect of the invention, a method for analyzing a structured document likely to be deformed from a first image and a second image of the document is therefore proposed, the method being in accordance with claim 1.

In the method according to the first aspect of the invention, estimation of the transformation between the two acquired images is relatively simple to perform. In fact, this transformation can be a homography whereof an approximation can be predetermined. Therefore, the accumulated computational load necessary for estimating the first and third transformation is reduced, with equal accuracy.

According to a second aspect of the invention, a method for analyzing a structured document likely to be deformed from a first image and a second image of the document is also proposed, the method being in accordance with claim 2.

The fourth transformation of the method according to the second aspect of the invention gives information on deformations complementary to those given by the first transformation. In other words, the second reference image and the second acquired image are used for more precisely characterizing those deformations of the structured document such as shown in the first acquired image, relative to the model shown in the first reference image. Eventually, the method according to the second aspect of the invention constitutes an alternative solution to the method according to the first aspect of the invention to reduce the computational load relative to the methods of the prior art, with equal accuracy.

In the two proposed methods, the steps for matching points and estimating geometric transformations are applied to the two acquired images showing the same document to be analyzed. Points of interest belonging to regions having personalized content can be matched; this constitutes a supplementary source of information to better characterize deformations undergone by the relevant structured document, and consequently refine later the analysis of the content of the document.

The methods according to the first aspect and the second aspect of the invention can be completed by way of the following optional characteristics, taken singly or in combination when technically possible.

The first image can be acquired while the document is lit by light radiation in a first wavelength band, and the second image be acquired while the document is lit by light radiation in a second wavelength band, the second wavelength band being different from the first wavelength band or else the second image being acquired after the first image.

The first wavelength band can be in the visible field, and the second wavelength band be in the infrared field, for example the near infrared field, or in the ultraviolet field.

The method can also be implemented from a third image acquired while the document is lit by light radiation in a third wavelength band different from the second wavelength band, in which case the second wavelength band is in the infrared field, the third wavelength band is in the ultraviolet field, and the method comprises determination of at least one third region to be analyzed in the third image, and analysis of the content of the third determined region.

The acquired images can show the document according to different viewing angles.

The acquired images can be acquired successively by means of the same lens, or else be acquired by separate lenses.

For a plurality of predetermined regions of interest of the first reference image, the method can further comprise estimation of a local geometric transformation specific to the region of interest, from the second points of interest located in the region of interest and the first points of interest with which these second points of interest have been matched, in which the first geometric transformation is also estimated from the local geometric transformations specific to the regions of interest of the first reference image. Alternatively or in addition, for a plurality of personalized regions of interest of the first acquired image, the method can further comprise estimation of a local geometric transformation specific to the personalized region of interest, from fourth points of interest (P4A1) located in the personalized region of interest and the third points of interest (P3A2) with which these fourth points of interest have been matched, in which the second geometric transformation is also estimated from the local geometric transformations specific to the personalized regions of interest of the first acquired image.

The fact of estimating local geometric transformations specific to predetermined and/or personalized regions of interest is much simpler than trying to estimate a single geometric transformation which would cover the whole surface of the documents shown in one of the acquired images. In fact, such a single transformation would be extremely complex in the event where this document is crumpled. It is comparatively easier to work region of interest by region of interest, as these regions of interest have restricted dimensions and the deformations undergone by the document in each of these regions of interest considered individually are much simpler.

The method can further comprise merging of results supplied from each analysis step.

Merging can comprise authentication of the document, in which authentication succeeds on condition that information is found during analysis of at least one of the acquired images, and not found during analysis of at least one other of the acquired images.

Each analysis can comprise recognition of characters, and in which merging comprises arbitration between the characters recognized during the steps of analysis.

For a plurality of regions of interest of the second reference image, the method according to the second aspect of the invention can further comprise estimation of a local geometric transformation specific to the region of interest, from the sixth points of interest located in the region of interest and the fifth points of interest with which these sixth points of interest have been matched, in which the fourth transformation is also estimated from the local geometric transformations specific to the regions of interest of the second reference image.

According to a third aspect of the invention, a computer program product is proposed comprising code instructions for executing the analysis method according to the first aspect of the invention or according to the second aspect of the invention, when this program is executed by a processor.

According to a fourth aspect of the invention, a device for analyzing content of a structured document likely to be deformed and configured to implement the method according to the first aspect of the invention, is also proposed.

According to a fifth aspect of the invention, a device for analyzing content of a structured document likely to be deformed is configured to implement the method according to the second aspect of the invention, is also proposed.

DESCRIPTION OF THE FIGURES

Other characteristics, aims and advantages of the invention will emerge from the following description which is purely illustrative and non-limiting and which must be viewed with respect to the appended drawings, in which.

In all figures, similar elements bear identical reference numerals.

DETAILED DESCRIPTION OF THE INVENTION

A. Structured Document

A structured document is a document in which at least some of the information of interest to be analyzed in the document is inscribed in one or more predetermined zones of known placement and fixed for all the documents of the same type, in contrast to a document on plain paper. The information borne by the document can as much be in the form of handwriting as printed characters or again be graphic elements such as images or logos. Such documents are for example identity documents such as passports, identity cards or driver licenses, forms, invoices, receipts, exam MCQ or game tickets. For each of these types of documents at least one document model is likely to be defined.

A structured document of a particular model has two types of regions of interest. Some of these regions of interest have predetermined content found in all documents of the same model, and others have personalized content, i.e., variable in documents of the same model. The regions of interest are systematically in the same place with the same contents in different structured documents coming from the same model, based on the assumption that these documents are in a non-deformed state. A region of interest can comprise one or more predetermined graphic elements (image, logo or character string in a predetermined font).

Figure 1:
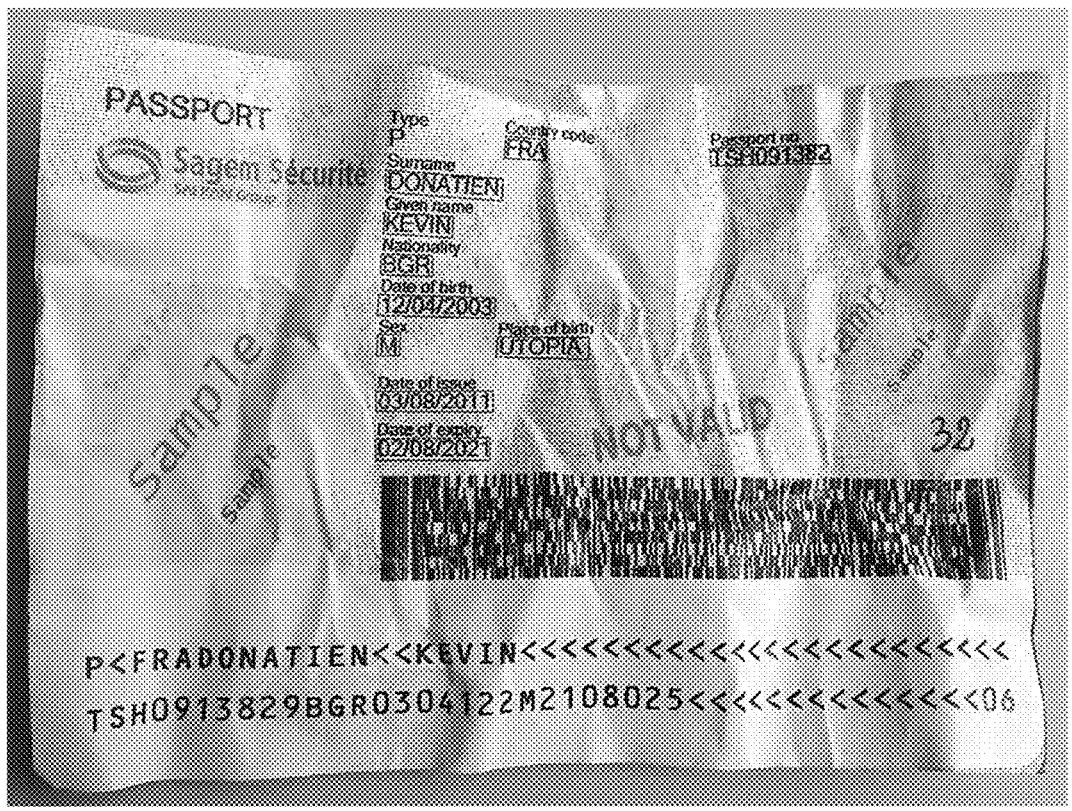
FIG. 1 shows a structured document in a deformed state.

By way of example, FIG. 1 shows a structured document of passport type. This document comprises especially a first region of interest comprising the character string "surname" in printed characters. This first region is of predetermined content in the sense as found on all other passports of the same model. This document also comprises a second personalized region of interest containing the last name of the holder of the passport (here "Donatien").

A structured document in a perfect state is generally planar, without folds. However, the passport shown in FIG. 1 is in a deformed state, more precisely crumpled.

B. Device for Analyzing Structured Document

Figure 2:
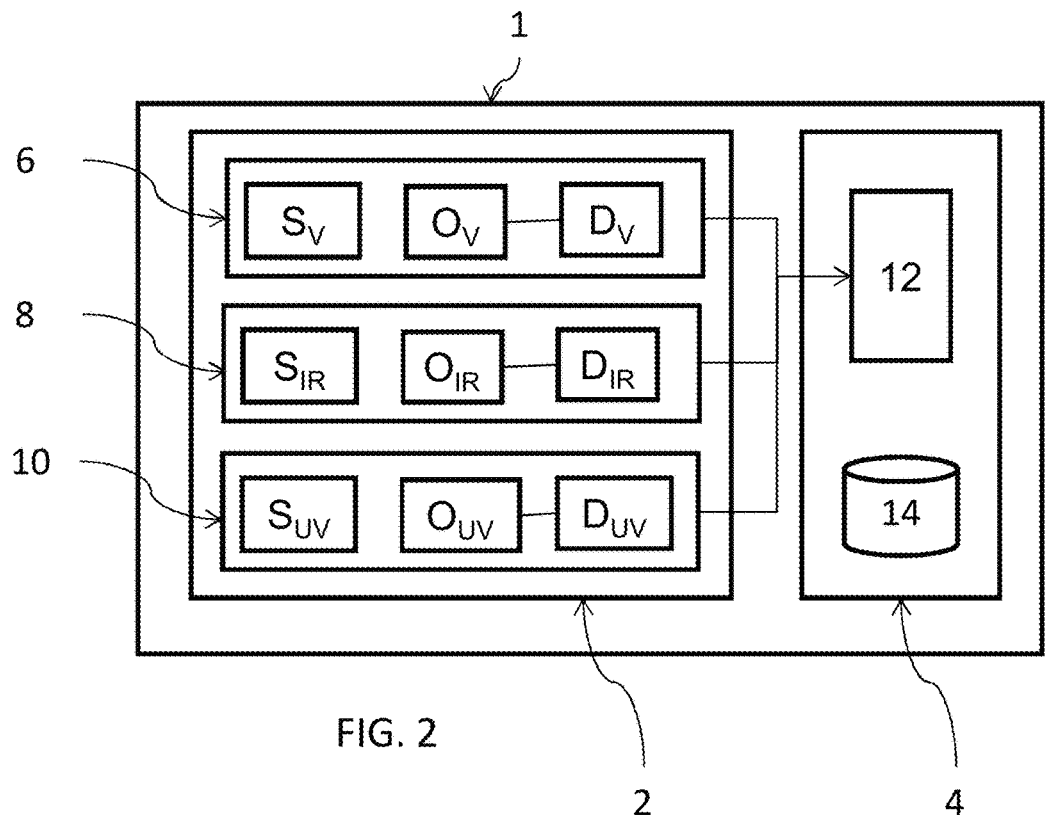
FIG. 2 schematically illustrates a device for analyzing a structured document, according to an embodiment, comprising an image acquisition module.

In reference to FIG. 2, a device 1 for analysis of structured document comprises a module 2 for acquiring image of the structured document, and a module 4 for processing the acquired images by the acquisition module 2.

The image acquisition module 2 can be configured to acquire images of different types.

The image acquisition module 2 is configured to produce at least one image of a first type containing information on the document to be analyzed when the document is lit by a light source in the visible field $S_V$. The light source in the visible field $S_V$ is a light source generating light radiation having at least one wavelength comprised in the interval ranging from 380 nanometers to 780 nanometers. The image acquisition module 2 can comprise such a light source in the visible field $S_V$ so as to illuminate the document to be analyzed. As a variant, the image acquisition module 2 does not comprise such a light source in the visible field and the document is simply subject to surrounding lighting. The image acquisition module 2 also comprises a sensor $D_V$ sensitive to the visible wavelength emitted by the source in the visible field $S_V$.

Also, the image acquisition module 2 is configured to produce at least one image of a second type containing information on the document to be analyzed when the document is lit by an infrared source (IR), i.e., a light source generating light radiation having at least one wavelength greater than 780 nanometers, for example in the near infrared field (from 780 nm to 3 μm). The image acquisition module 2 comprises such an infrared source $S_{IR}$ and also an infrared sensor $D_{IR}$ sensitive to the infrared wavelength emitted by the infrared source $S_{IR}$.

Also, the image acquisition module 2 is configured to produce at least one image of a third type containing information on the document to be analyzed when the document is lit by an ultraviolet source (UV), i.e., a light source generating light radiation in the ultraviolet field (radiation having at least one wavelength of less than 380 nanometers). The image acquisition module 2 comprises such a UV source, noted $S_{UV}$.

Somewhat incorrectly, the images according to the first type, second type and third type are hereinbelow called respectively "visible images", "infrared images" and "UV images".

In the embodiment illustrated in FIG. 2, the image acquisition module 2 comprises three image capture units, each comprising a lens defined by an optical axis: a first unit 6 comprising a first lens $O_V$ for acquiring visible images, a second unit 8 comprising a second lens $O_{IR}$ for acquiring infrared images, and a third unit 10 comprising a third lens $O_{UV}$ for acquiring UV images. The three types of image can be produced in parallel by the three image capture units 6, 8, 10.

Figure 3:
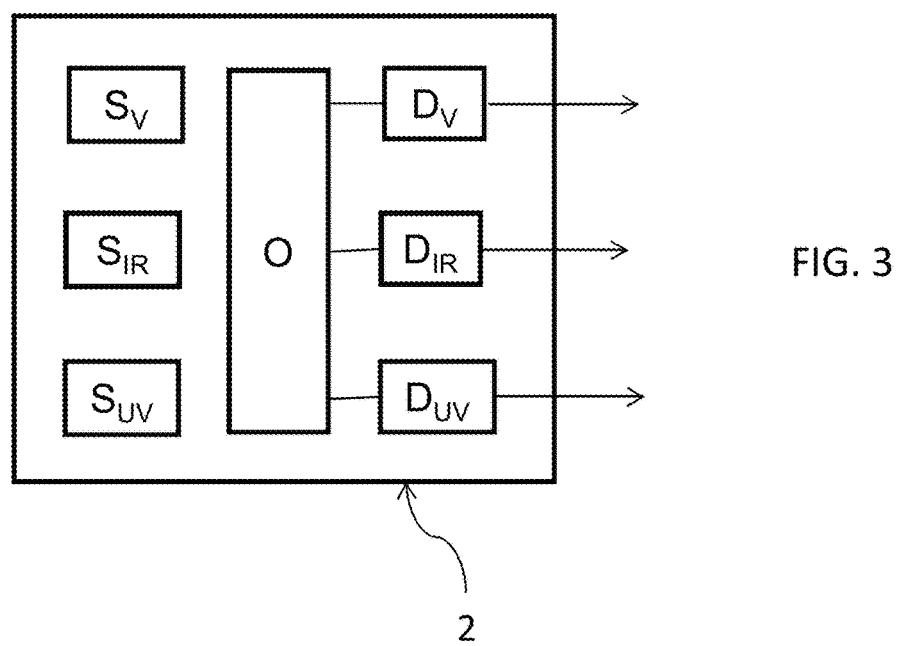
FIG. 3 schematically illustrates an image acquisition module according to another embodiment.

In another embodiment illustrated in FIG. 3, the acquisition module 2 comprises a single lens O used for acquiring several types of images, for example the three types of images. This image acquisition module 2 is configurable in an acquisition mode in the visible field, in an acquisition mode in the infrared field and in an acquisition mode in the ultraviolet field.

The image acquisition module 2 typically comprises an infrared filter mobile between an active position and an inactive position. The infrared filter is adapted to selectively maintain at least one infrared wavelength emitted by the infrared source and eliminate any wavelength in the visible field.

When the image acquisition module 2 is configured in the visible acquisition mode, the acquired images by the image acquisition module 2 are classified as visible images. The light source in the visible field optionally integrated into the image acquisition module 2 is activated in the visible acquisition mode.

When the image acquisition module 2 is configured in the infrared acquisition mode, the infrared source is activated, and the infrared filter is positioned in the active position. Infrared radiation emitted by the source is projected towards the document to be analyzed.

When the document comprises some materials sensitive to infrared (this is the case typically with some inks), the infrared radiation is reflected by the surface of the document, then is received by the lens of the image acquisition module 2. However, the viewing system simultaneously captures visible radiation if the document is not placed in darkness. The received radiation passes through the infrared filter; only infrared wavelengths are kept in the radiation obtained leaving the filter. An infrared image is produced on the basis of filtered radiation.

When the image acquisition module 2 is configured in the ultraviolet acquisition mode, the UV source is activated. The infrared filter is also positioned in the inactive position. The UV radiation emitted by the UV source is projected towards the document to be analyzed.

The document is likely to present some information invisible to the naked eye, but which becomes visible when these defects are lit by UV radiation. Incident UV radiation undergoes a wavelength shift to the visible field, even though radiation reflected by the document comprises at least one wavelength in the visible field carrying information on these defects. This reflected radiation is received by the viewing device, and an image of the third type is produced on the basis of this received radiation. As the infrared filter is in its inactive position, the received radiation is not filtered by the infrared filter. Such information invisible to the naked eye are for example used to make it more difficult to copy structured documents with an official character, such as an identity card or a passport.

Eventually, the image acquisition module 2 is configured to produce at least one type of image from the three types of images above. It will be clear below that these different images, information carriers different but complementary, can be advantageously combined to improve the precision of analysis of the structured document.

Back to FIG. 2, the image-processing module 4 comprises at least one processor 12 configured to execute algorithms for processing images which will be detailed below.

The image-processing module 4 also comprises at least one memory 14 for storing data, especially images received from the acquisition module or images resulting from processing of images executed by the processor.

The memory 14 especially stores at least one reference image showing a model of structured document in a non-deformed state.

The model of document shown in a reference image comprises several regions of interest of predetermined content.

Also stored in memory, for each region of interest of predetermined content, are points of interest associated with the region. Each point of interest is for example defined by a couple of coordinates for locating it in the reference image.

However, not identified in the reference image are points of interest relating to personalized regions of interest, for the simple reason that the model shown in this reference image includes no such personalized regions of interest.

Figure 4:
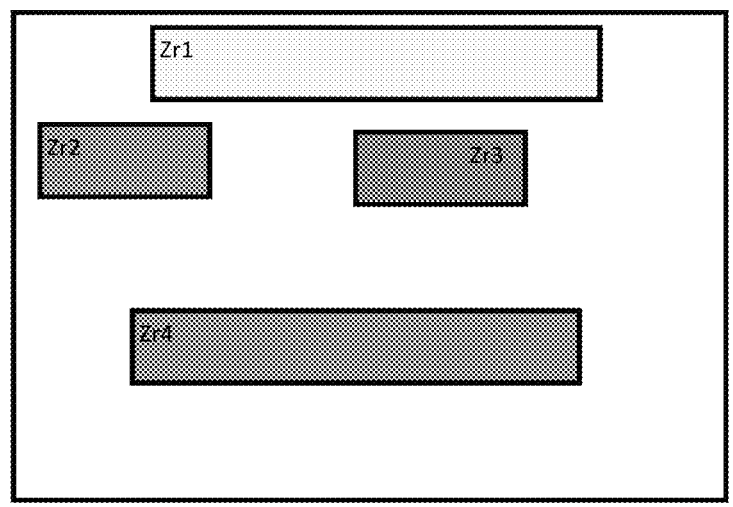
FIG. 4 shows an example of a reference image showing a model of a structured document.

By way of example, FIG. 4 illustrates a reference image M1 having four regions of interest of predetermined content Zr1, Zr2, Zr3, Zr4, of rectangular forms. For example, four points of interest, corresponding to the four corners of these regions are stored for each of these three regions of interest, taking account of that other points of interest located inside these regions can be used.

The reference image M1 is for example a visible image having been acquired previously by the image acquisition module 2, or by an equivalent device.

As will be evident below, other reference images can also be stored in the memory, each reference image is associated with a type of image likely to be acquired by the image acquisition module 2. The memory can store at least one visible image (whereof the image M1) and/or at least one infrared reference image and/or at least one UV reference image.

C. Method for Analyzing Content of a Structured Document

Several embodiments of a method for analyzing document such as that shown in FIG. 1 will be described below by means of the device according to one of the FIG. 2 or 3.

Figure 5:
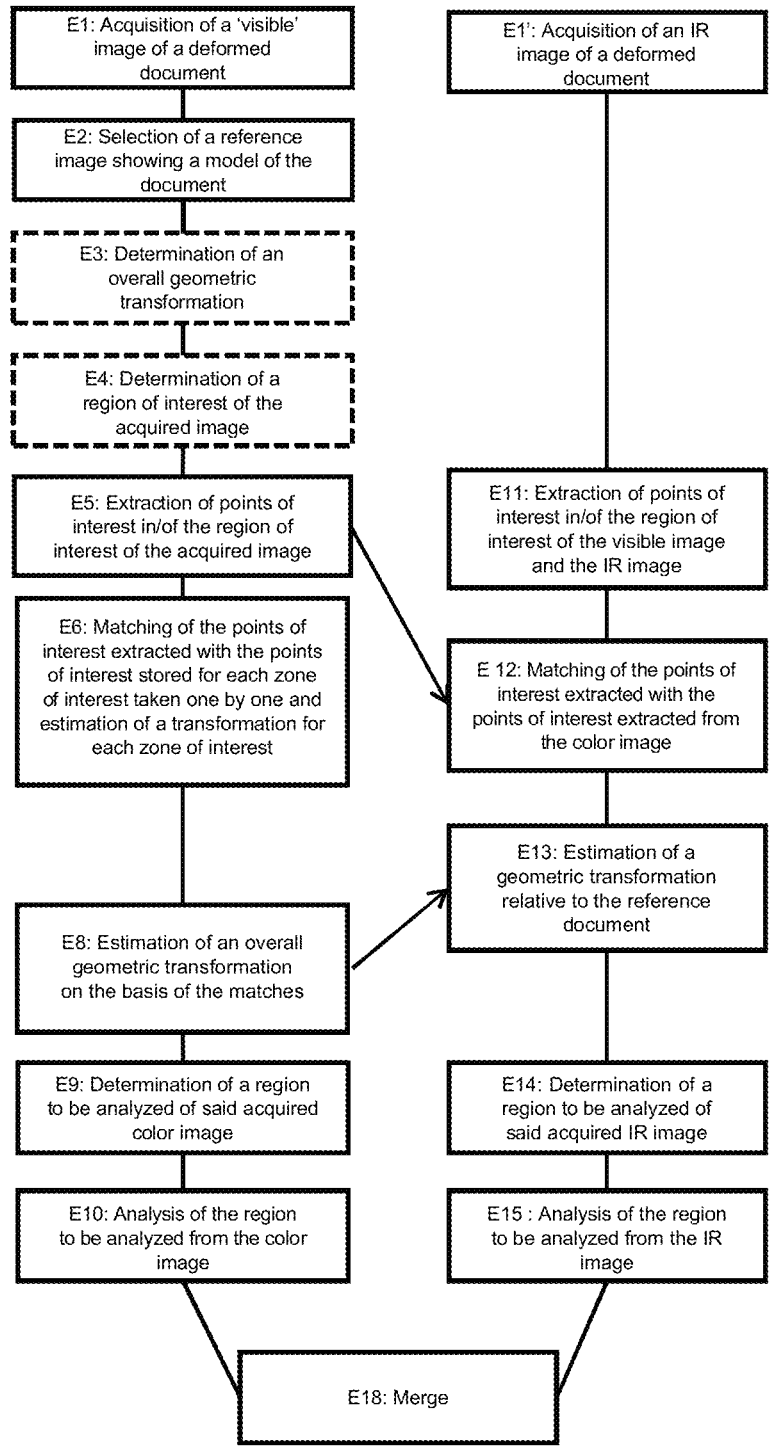
FIG. 5 is a flowchart of steps of a method for analyzing a structured document, according to a first embodiment of the invention.

C. 1. First Embodiment of Method Using a Reference Image and Two Acquired Images The steps of an analysis method according to a first embodiment are illustrated on the flowchart of FIG. 5.

The image acquisition module 2 acquires a first visible image A1.

The first acquired image A1 is stored in the memory 14 of the image-processing module 4.

Figure 6:
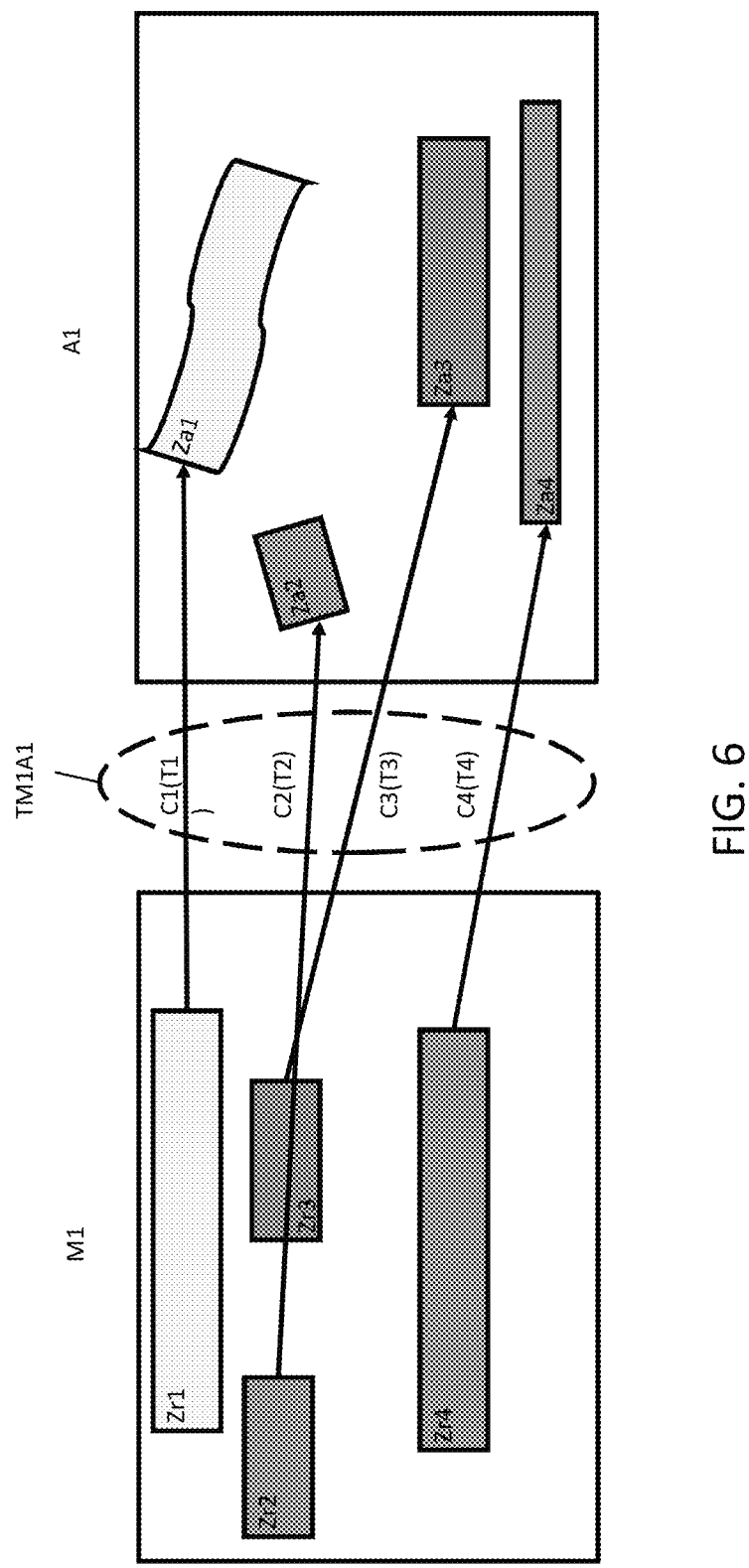
FIG. 6 shows the reference image of the FIG. 4, a first acquired image showing a structured document, and matches of points between the two images taken during a step of the method of FIG. 5.
Figure 7:
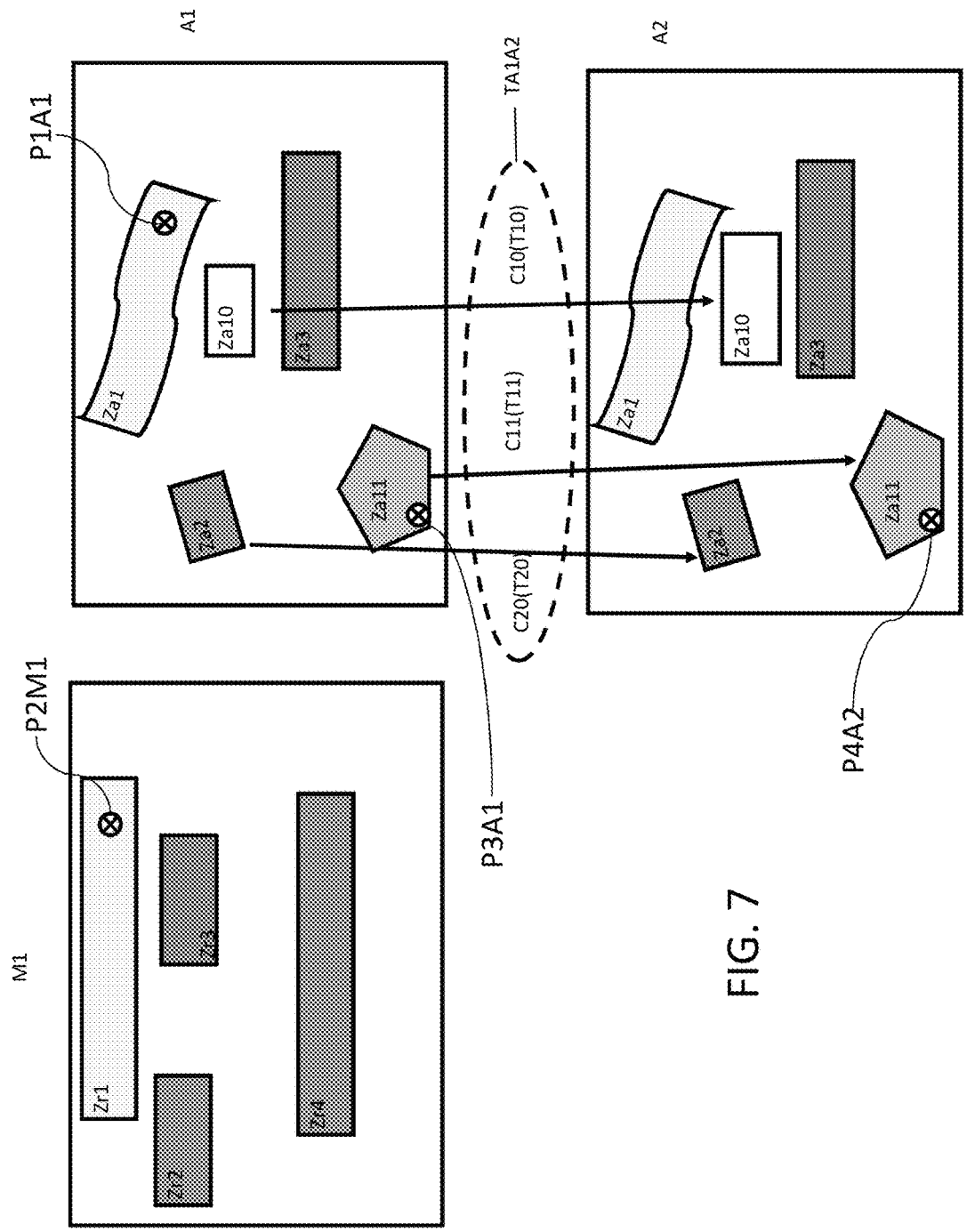
FIG. 7 shows, apart from the images of FIG. 6, a second acquired image showing a structured document, and matches of points between the two acquired images, taken during another step of the method of FIG. 5.

In reference to FIGS. 6 and 7, the first acquired image A1 shows the document and more precisely regions of interest Za1, Za2, Za3, Za4, Za10, Za11. Some of these regions (regions Za1, Za2, Za3, Za4) have a predetermined content similar to regions of interest Zr1, Zr2, Zr3, Zr4 of the reference image M1.

As evident from FIG. 6, the deformations of the document to be analyzed are such that the regions of interest of predetermined content Za1 to Za4 do not appear exactly in the same form, orientation and/or position in the image A1 as the corresponding regions of interest Zr1 to Zr4 in the reference image M1.

When several reference images associated with the "visible" image type are stored in the memory, one of them is selected (step E2). It is assumed below that the image M1 is selected as reference visible image.

The image-processing module 4 determines in the image acquired at least one region of interest (step E4).

The image-processing module 4 extracts points of interest in the acquired image A1, according to a process known from the prior art (step E5).

The image-processing module 4 matches points of interest of the region of interest Zr1 of the image M1, stored in the memory, with points of interest extracted in the image A1 (step E6), according to a method known from the prior art. By way of example, the point P1A1 Located in the zone Za1 is matched with the point P2M1 Located in the zone Zr1.

By way of convention Ci denotes all matches made for the region Zr1. The set C1 is representative of deformations local to the region Zr1, seen by the document to be analyzed relative to the model shown in the reference image M1.

Optionally, the image-processing module 4 further estimates a local geometric transformation specific to the region of interest Zr1, from the matches C1. By way of convention Ti denotes the geometric transformation realized for the region Zr1. The transformation Ti is computed for example from:
- an affine model determining affine application connecting the points of interest of the region Zai of the acquired image A1 and points of interest of the region Zr1 of the reference image M1, such as translation, rotation or homothety or scaling, or a combination of these transformations. Such a model preserves the alignments of points and the ratios of distances between points of the document,
- a homographic model determining homographic application connecting the points of interest of the acquired image A1 and the points of interest of the reference image M1. Such a model matches a plane of a planar surface seen by a camera with the plane of the same surface in another image,
- a model of interpolation determined by means of an inverse distance weighting algorithm, as proposed in document "Franke R., 1982, Scattered data interpolation: tests of some methods, mathematical of computation, 38(157), 181-200", and/or spline interpolation.

A transformation Ti supplies information on deformation more complete than a set Ci of matches of points of interest alone.

The preceding steps E4, E5, E6 are repeated for each region of interest Zr1 of the model shown in the reference image M1. The matches C2, C3, C4 and the associated transformations T2, T3, T4 are thus obtained, as shown in FIG. 6.

In the case of complex deformations (such as crumpling shown in FIG. 1), the transformations T1 to T4 are of course different relative to each other.

From the matches C1-C4, and if needed from the corresponding transformations T1-T4, the image-processing module 4 estimates an overall geometric transformation TM1A1 taking account of deformations of the structured document shown in the first acquired image relative to the first model, according to a known process of the prior art (step E8). The transformation TM1A1 is overall in that it covers the complete model shown in the reference image and the document shown in the acquired image A1.

By way of example, the transformation TM1A1 can be determined by means of an inverse distance weighting algorithm or spline interpolation.

The overall transformation TM1A1 can be seen as a piecewise-continuous function on a domain of definition of dimension 2 corresponding at least to the entire model shown in the reference image A1 to an image field also of dimension 2 corresponding at least to all of the structured document shown in the acquired image A1. The domain of definition is the set of pixels of the reference image M1. The image of each pixel of the image M1 by this transformation TM1A1 is a pixel of the acquired image A1.

The computation applied by this overall transformation TM1A1 is different according to the placement of the pixel of the relevant reference image. For example, the overall transformation uses the local transformation Ti to transform a pixel located in the region of interest Zr1. However, a pixel located outside any zone of interest Zr1 shown in the reference image is transformed by the transformation TM1A1 for example by means of the local transformation Ti of the region Zr1 nearest to this pixel.

The geometric transformation TM1A1 characterizes deformations such as crumpling, which is deformations much more complex than simple deformations due to the perspective caused by poor positioning of the processed document, for example in an inclined plane relative to the imaging plane, as is the case of the method described in document WO2011/058418.

It will be clear hereinbelow that other overall geometric transformations are estimated on the basis of different pairs of images showing the structured document or a model associated with the latter. By way of convention, "TXiYj" is called an overall geometric transformation, taking account of deformations of a document shown in the image "Yj" relative to a document shown in the image "Xi".

The image-processing module 4 then determines at least one region to be analyzed in the first acquired image A1, by projection of at least one reference region of the reference image M1 by means of the first transformation TM1A1 (step E9).

A reference region is for example one of the regions of interest of the reference image M1.

The image-processing module 4 then analyzes the content of the determined region during step E9 according to a known process (step E10): character recognition (OCR), etc.

It is clear that the personalized regions of interest Za10 and Za11 shown in the acquired image A1 have not been used so far.

To use these personalized regions of interest, a second image A2 showing the same structured document is acquired by the image acquisition module 2 (step E1').

The second image A2 can be an image of the same type as the first image (therefore an image acquired with the same lighting conditions as during acquisition of the image A1), but in this case showing the document from a different viewing angle. This different viewing angle can be attained by displacement of a lens of the acquisition module between acquisitions of the images A1 and A2 (this displacement being natural when the acquisition module is embedded in a portable mobile terminal).

Alternatively, the second image A2 can be of a type different from that of the first acquired image A1 (infrared or UV). In this case, the second image can show the document from a viewing angle identical or different from the image A1.

In the following, it is assumed that the image A2 is an infrared image.

The second acquired image A1 is stored in the memory 14 of the image-processing module 4.

The image-processing module 4 extracts points of interest in the second acquired image A2 (step E11), according to the same process as that used during step E5.

It is possible that points of interest contained in the regions of interest Za10 or Za11 in the first acquired image have been extracted during step E5. However, these points of interest have not been matched with points of interest of the reference image M1, as these regions have a personalized content.

The image-processing module 4 matches points of interest extracted in the second acquired image A2 with these points of interest extracted in the first acquired image A1 still unused during step E11. In other words, it is possible that at least one of the points of interest coming from the image A1 used here is different from each of the points of interest coming from the same image A1 matching with a point of the reference image M1.

In the example illustrated in FIG. 7, the point P3A1 located in the zone Za11 shown in the image A1 is matched with the point P4A2 located in the zone Za11 shown in the image A2. Also, the set of matches C10, C11 respectively corresponding to the regions Za10, Za11, between the images A1 and A2, are obtained. These two sets combine on points which have not been extracted during step E5. Also, the set of matches C20 for the zone Za2 is obtained. To constitute this set, points extracted during step E6 can have been reused.

In the same way as during step E6, the image-processing module 4 estimates from the matches made in the preceding step E11 a geometric transformation TA1A2, taking account of deformations of the document shown in the second acquired image A2 relative to the document shown in the first acquired image A1.

This characterizes the deformations undergone by regions of interest of the structured document with personalized content, which could not be carried out by means of the reference image M1, which identifies only regions of interest of predetermined content.

The following data especially are considered for estimating this geometric transformation TA1A2:
sets C10, C11, C20
optionally, local geometric transformations T10, T11, T20, computed as per the process described previously, shown in FIG. 7.

The image-processing module 4 then estimates a geometric transformation, taking account of deformations of the document shown in one of the two acquired images A1 or A2, called target image, relative to the first model, the transformation dependent on the second transformation TA1A2 (step E13).

The image A2 is used as target image during step E13. The transformation estimated during step E13 is the composition TM1A2 of the geometric transformations TM1A1 and TA1A2:

$$TM1A2 = TM1A1 \circ TA1A2$$

The image-processing module 4 then determines at least one region to be analyzed in the target image A2 by projection of the same reference region as that determined during step E9, by means of the geometric transformation TM1A2 estimated during step E13.

The image-processing module 4 then analyzes the content of the determined region in the image A2 (step E15), for example in the same way as during step E10.

Analysis of the acquired images A1, A2 (steps E10, E15) can comprise the same processing, for example character recognition (OCR), or recognition of predetermined patterns, known per se.

The results of analysis of the different acquired images A1, A2 are then combined into a merging step (step E18).

Par example, the merging E18 comprises an authentication of the structured document whereof the result depends on analysis of the acquired images A1, A2. Typically, when the or a reference region is a region containing a safety pattern selectively revealed by infrared lighting of the structured document, authentication succeeds on condition that this safety pattern is detected in the infrared image A2 during analysis E15, but not detected in the visible image A1 during analysis E10: the structured document is considered as authentic. If not, authentication fails: the structured document is considered to be inauthentic.

Alternatively or in addition, merging comprises arbitration between characters detected during analyzes E10, E15. This can be performed when the structured document comprises a character string visible in each of the acquired images A1, A2. Assuming for example that the image-processing module 4 detects in the image A1 the character string ABRUCADABRA, and in the image A2 the character string ABRACADABRU, then the character string which really appeared in the document shown in these images is ABRACADABRA. A detection confidence index is produced for each character. For example, is associated with the final "A" detected in the image A1 a confidence index of value greater than the confidence index associated with the final "U" detected in the image A2; the "A" is therefore retained. Similarly, associated with the "U" in fourth position of the character string detected in the image A1 is an confidence index less than the confidence index associated with the character "A" of the same position detected in the image A2: this A in fourth position of the character string coming from A2 is retained. Here, the effect of the merging step E18 is to synergistically consolidate the results of both analyzes.

Figure 8:
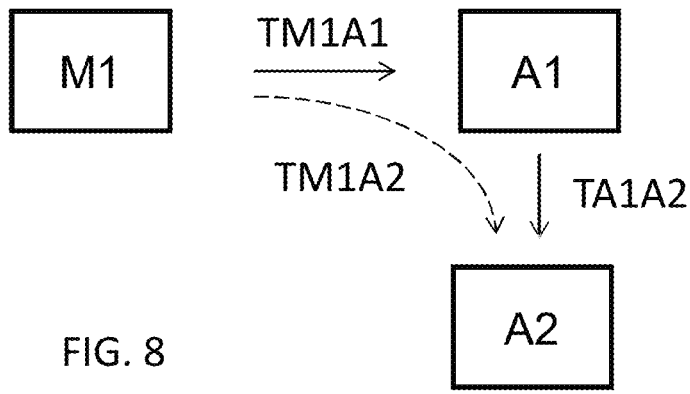
FIG. 8 schematically illustrates images used during implementation of the method of FIG. 5, and geometric transformations between these images.

In the method embodiment presented hereinabove, a single reference image M1 has been advantageously used to determine a same reference region to be analyzed in the acquired images A1, A2. In this respect, it should be noted that estimation of the transformation TA1A2 between the acquired images A1 and A2 is relatively simple to execute, and that there is no direct matching of points of interest between the images M1 and A2, as illustrated schematically in FIG. 8. In fact, the transformation TA1A2 can be a homography whereof an approximation can be predetermined and be a function of the way in which the image acquisition module 2 is designed. Therefore, the accumulated processing time for estimating the transformations TM1A1 and TM1A2 is reduced.

Figure 9:
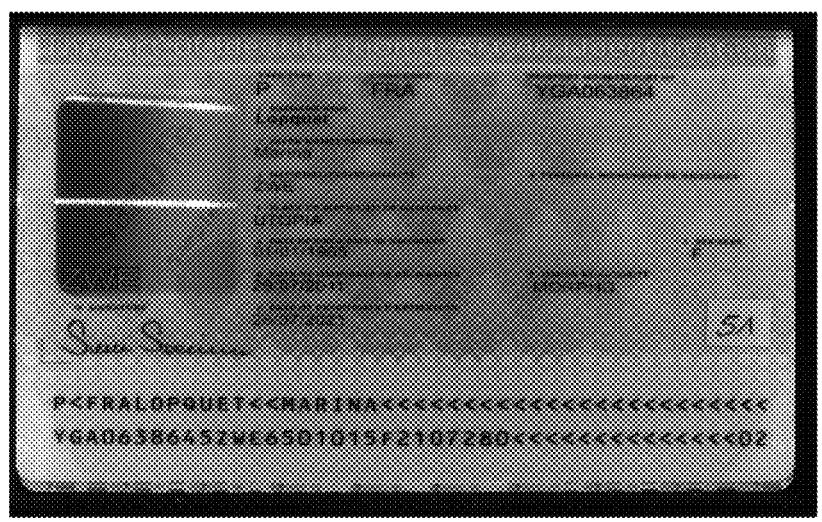
FIG. 9 is a concrete example of a reference image likely to be used during implementation of the method of FIG. 5.
Figure 10:
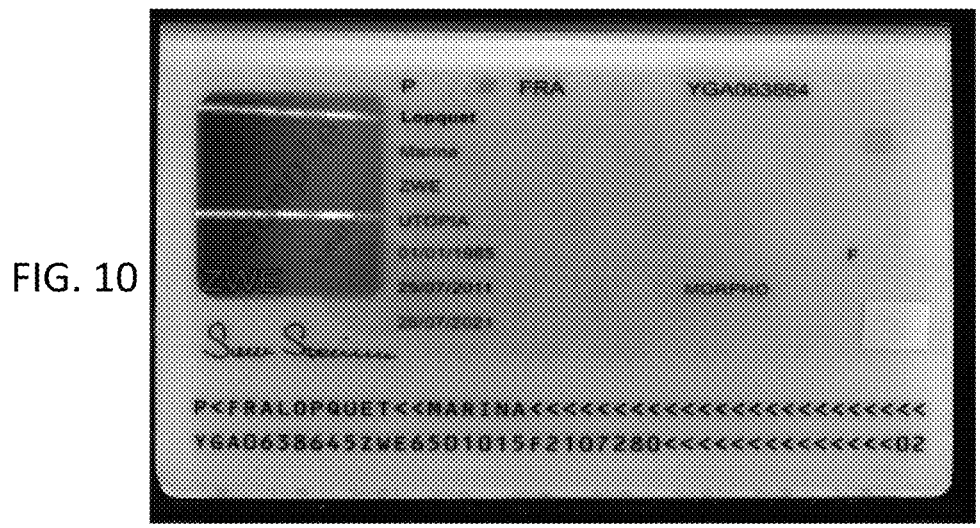
FIG. 10 is a concrete example of an image acquired during implementation of the method of FIG. 5.

By way of example, FIG. 9 shows an example of reference image M1 showing a structured document of passport type. FIG. 10 shows an example of an acquired image A2 in the infrared field.

It should be noted that non-personalized fields do not show up in the acquired image A2. In this way, the transformation TM1A2 cannot be estimated satisfactorily directly on the basis of the image A2.

Figure 11:
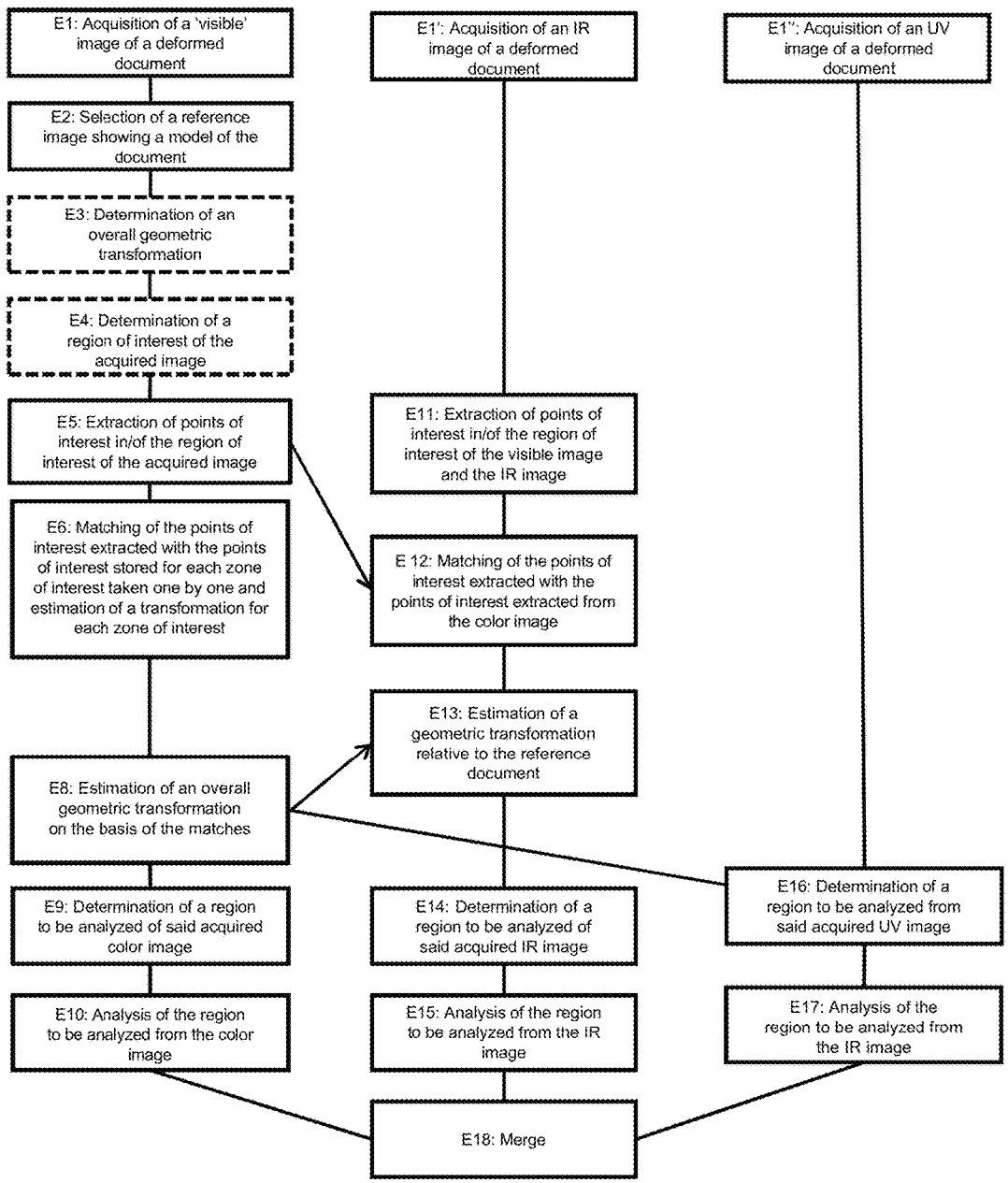
FIG. 11 is a flowchart of steps of a method for analyzing a structured document, according to a second embodiment of the invention.

C.2. Second Embodiment of Method Using a Reference Image and Three Acquired Images The steps of a second method embodiment are shown on the flowchart of FIG. 11.

In this second embodiment, at least one third image A3 can also be acquired by the image acquisition module 2 (step E1"). The third image A3 is for example an image of UV type, constituting a source of complementary information on the deformations of the document to be analyzed.

In this second embodiment, the images A1 and A3 have been acquired by means of a same lens at close instants; it is supposed that the two images A1 and A3 show the structured document at the same viewing angle. Therefore, the image-processing module 4 then determines at least one region to be analyzed in the image A3 by projection of the same reference region as that used during steps E9 and E14, by means of the estimated geometric transformation TM1A1 (step E16).

As a variant, if the images A1 and A3 do not show the structured document at the same viewing angle, the processing steps taken by the image-processing module 4 on the basis of the image A2 can be repeated for the third image A3 to produce a geometric transformation TM1A3 resulting from the composition of the transformation TM1A1 already discussed and a transformation TA1A3 between the acquired images A1 and A3. The image-processing module 4 can then determine at least one region to be analyzed in the image A3 by projection of the same reference region as that used during steps E9 and E14, by means of the estimated geometric transformation TM1A3.

The image-processing module 4 then analyzes the content of the determined region (step E17), for example in the same way as during step E10 or E15.

The merging step 18 is conducted not on the basis of two images, but three images A1, A2 and A3, according to the modalities previously described.

As in the first embodiment, the method according to the second embodiment uses a single reference image M1 to determine the same reference region to be analyzed in the acquired images A1, A2. Also, the UV image constitutes a source of complementary information for improving the merging processing conducted during step 18.

Figure 12:
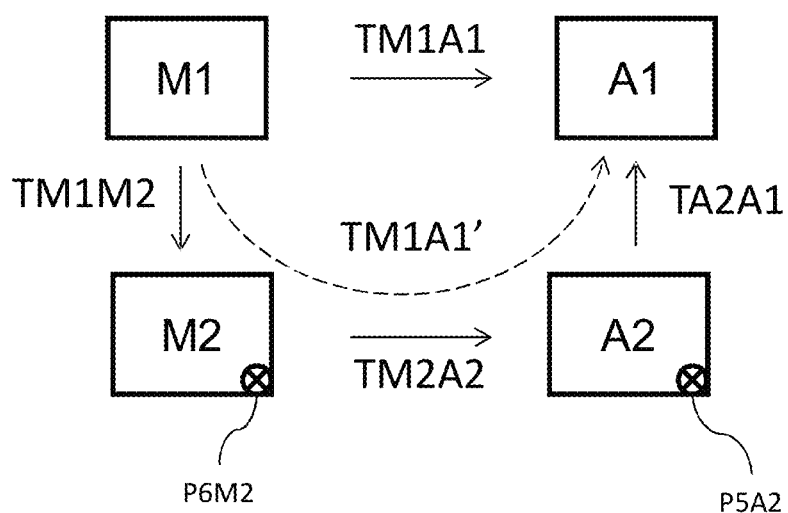
FIG. 12 schematically illustrates images used during a method for analyzing a structured document according to another embodiment of the invention, and geometric transformations between these images.

C.3. Third Embodiment of Method Using Two Reference Images and Two Acquired Images In a third embodiment whereof the general principle is schematically illustrated in FIG. 12, another reference image M2 is used in addition to the reference image M1. Also, the image A1 is used as target image.

The second reference image M2 is of the same type as the second acquired image A2 (of infrared type in the preceding examples). The second reference image M2 is for example acquired during a preliminary step by means of the acquisition module, in the same lighting conditions as those used for acquiring the image A2.

Similarly to the first reference image M1, the second reference image M2 shows a model of the structured document having regions of interest of predetermined content. However, these regions of interest are not necessarily the same as those shown in the reference image M1. The model shown in the image M2 therefore relates to the same structured document but can be different from the model shown in the image M1 in terms of content.

The second reference image M2 comprises at least one region of interest of predetermined content not presented in the image M1. This region for example has content revealed by infrared only, such as a security pattern. By way of example, information can have been printed or written on the document to be analyzed by means of visible but optically variable ink, and other information by means of infrared ink not visible to the naked eye but revealed in an infrared image, such ink traditionally being optically more stable than visible ink.

Also, regions of interest can appear in the image A1 in the visible field, but not in the infrared image A2.

The models shown in the reference images M1 and M2 can be shown from different viewing angles. In this case, it is supposed that a predetermined geometric transformation TM1M2 has previously been stored in the memory, taking account of deformations of the model shown in the image M2 relative to the model shown in the image M1. For example, when the two models shown in the images M1 and M2 are not deformed, this transformation TM1M2 is simply representative of a change in viewing angle between the images M1 and M2.

The image-processing module 4 estimates a geometric transformation TM1A1', taking account of deformations of the document shown in the acquired image A1, relative to the first model M1, the transformation dependent on the second transformation TA1A2.

More precisely, the transformation TM1A1' is obtained by composition of the inverse of the transformation TA1A2 (inverse noted TA2A1), of the transformation TM2A2, and of the predetermined transformation TM1M2.

$$TM1A1' = TM1M2 \circ TM2A2 \circ TA2A1$$

The transformation TM2A2 is estimated from matches of points of interest of the image M2 (such as point P6M2 shown in FIG. 12) with points of interest extracted in the acquired image A2 (such as point P5A2 shown in FIG. 12), in the same way as for the transformation TM1A1. The points P6A2 and the points P4A2 (requested to obtain the transformation TA1A2) can be identical or different.

As for the transformation TM1A1, the transformation TM1A1' estimated in this way takes account of deformations of the structured document shown in the first acquired image A1 relative to the model shown in the first reference image M1. However, as illustrated schematically by FIG. 12, this transformation TM1A1' gives information on deformations complementary to those given by the transformation TM1A1, due to the fact that the matches of points of interest between the images A1 and A2 are not the same as the matches of points of interest between the images M1 and A1. In other words, in this embodiment, the images M2 and A2 have been used to more accurately characterize the deformations of the structured document as shown in the image A1 relative to the model shown in the reference image A1.

C.4. Other Embodiments of Method Using Several Reference Images and Several Acquired Images The characteristics described in parts C.2 and C.3 can be combined: in particular, it can be possible that the matches made between the images A1 and A2 serve not only to perform analysis of the image A2 during step E15, and this by means of the transformation TM1A2 (see part C.2), but also to improve analysis of the image A1 made during step E10, by computation of the transformation TM1A1' (see part C.3). In both cases, the image considered as target image is different. Eventually, additional information on deformation obtained from the image A2 can not only serve during step E14 to accurately locate a region of interest in the image A2, but also serve to improve the quality of the analysis E10 performed on the visible image A1.

Also, the principle described in part C.3 can be generalized for any acquired image Ai other than the image A1, under the assumption that a reference image Mi other than the reference image M1 is stored in the memory 14. Given the deformations of the structured document shown in the acquired image A1 relative to the model shown in the reference image M1, a transformation $TM1A1^{(i)}$ can be obtained as follows:

$$TM1A1^{(i)} = TM1Mi \circ TMiAi \circ TAiA1$$

Therefore, each additional transformation $TM1A1^{(i)}$ can be used in addition to the transformation TM1A1 during step E9 for determining one or more regions of the image A1 in light of analysis of their content during step E10.

This principle can also be generalized to any acquired image Aj considered as target image. The image-processing module 4 can determine at least one region to be analyzed in the target image Aj by projection of a reference region of the reference image Mj by means of a geometric transformation TMjAj, but also by means of at least one other geometric transformation obtained as follows:

$$TMjAj^{(i)} = TMjMi \circ TMiAi \circ TAiAj$$

where i and j are different.

The invention claimed is:

1. A method for analyzing content of a deformable structured document from a first acquired (E1) image (A1) and a second acquired (E1') image (A2) each showing the document, and comprising steps of:
    matching (E6) first points of interest (P1A1) extracted in the first acquired image (A1) with second points of interest (P2M1) of a first reference image (M1) showing a first model of the document,
    estimation (E8) of a first geometric transformation (TM1A1) taking account of deformations of the structured document shown in the first acquired image (A1) relative to the first model, from the matches made in the preceding step,
    determination (E9) of at least one first region to be analyzed in the first acquired image (A1), by projection of at least one reference region of the first reference image by means of the first transformation (TM1A1),
    analysis (E10) of the content of the first determined region,
    wherein the method further comprises steps of:
    matching (E12) third points of interest (P3A2) extracted in the second acquired image (A2) with fourth points of interest (P4A1) extracted in the first acquired image (A1),
    estimation (E13), from the matches made in the preceding step (E12), of a second geometric transformation (TA1A2) taking account of deformations of the document shown in the second acquired image (A2) relative to the document shown in the first acquired image (A1),
    estimation of a third geometric transformation (TM1A2) taking account of deformations of the document shown in the second acquired image (A2) relative to the first model shown in the first reference image (M1), wherein the third transformation is a composition of the first geometric transformation (TM1A1) and of the second geometric transformation (TA1A2),
    determination (E14) of at least one second region to be analyzed in the second acquired image (A2) by projection of the reference region of the first reference image by means of the third geometric transformation,
    analysis (E15) of the content of the second determined region.

2. A method for analyzing content of a deformable structured document from a first acquired (E1) image (A1) and a second acquired (E1') image (A2) each showing the document, and comprising steps of:
    matching (E6) first points of interest (P1A1) extracted in the first acquired image (A1) with second points of interest (P2M1) of a first reference image (M1) showing a first model of the document,
    estimation (E8) of a first geometric transformation (TM1A1) taking account of deformations of the structured document shown in the first acquired image (A1) relative to the first model, from the matches made in claim 1,
    determination (E9) of at least one first region to be analyzed in the first acquired image (A1), by projection of at least one reference region of the first reference image by means of the first transformation (TM1A1),
    analysis (E10) of the content of the first determined region,
    wherein the method further comprises steps of:
    matching (E12) third points of interest (P3A2) extracted in the second acquired image (A2) with fourth points of interest (P4A1) extracted in the first acquired image (A1),
    estimation (E13), from the matches made in the preceding step (E12), of a second geometric transformation (TA1A2) taking account of deformations of the document shown in the second acquired image (A2) relative to the document shown in the first acquired image (A1), matching fifth points of interest (P5A2) extracted in the second acquired image (A2) with sixth points of interest (P6M2) of a second reference image (M2) showing a second model of the document, estimation, from the matches made in the preceding step, of a third geometric transformation (TM2A2) taking account of deformations of the document shown in the second acquired image (A2) relative to the second model, estimation of a fourth geometric transformation (TM1A1') taking account of deformations of the document shown in the first acquired image (A1) relative to the first model shown in the first reference image (M1), in which the fourth transformation is a composition of the inverse (TA2A1) of the second transformation (TA1A2), of the third transformation (TM2A2), and of a fifth predetermined geometric transformation (TM1M2) taking account of deformations of the second model relative to the first model, determination (E9) of at least one second region to be analyzed in the first acquired image (A1) by projection of the reference region of the first reference image by means of the fourth geometric transformation (TM1A1'), analysis (E10) of the content of the second determined region.

3. The method according to claim 2, further comprising a step of for a plurality of region of interest of the second reference image, estimation of a local geometric transformation specific to the region of interest, from the sixth points of interest (P6M2) located in the region of interest and the fifth points of interest (P5A2) with which these sixth points of interest (P6M2) have been matched, wherein the third transformation (TM2A2) is also estimated from the local geometric transformations specific to the regions of interest of the second reference image (M2).

4. The method according to claim 1, wherein:
the first image (A1) is acquired (E1) while the document is lit by light radiation in a first wavelength band,
the second image (A2) is acquired (E1') while the document is lit by light radiation in a second wavelength band,
the second wavelength band is different from the first wavelength band or else the second image is acquired after the first image.

5. The method according to claim 4, wherein
the first wavelength band is in the visible field, and
the second wavelength band is in the infrared field, for example the near infrared field, or in the ultraviolet field.

6. The method according to claim 5, also implemented from a third image (A3) acquired (E1") while the document is lit by light radiation in a third wavelength band different from the second wavelength band, and wherein:
the second wavelength band is in the infrared field,
the third wavelength band is in the ultraviolet field, the method further comprises steps of:
determination (E16) of at least one third region to be analyzed in the third image (A3),
analysis (E17) of the content of the third determined region.

7. The method according to claim 1, wherein the acquired images (A1, A2, A3) show the document according to different viewing angles.

8. The method according to claim 7, wherein the acquired images (A1, A2, A3) are acquired (E1, E1', E1") successively by means of the same lens, or else are acquired by separate lenses.

9. The method according to claim 1, further comprising
for a plurality of predetermined regions of interest of the first reference image (M1), estimation of a local geometric transformation specific to the region of interest, from the second points of interest (P2M1) located in the region of interest and the first points of interest (P1A1) with which these second points of interest (P2M1) have been matched, in which the first geometric transformation (TM1A1) is also estimated (E8) from local geometric transformations specific to the regions of interest of the first reference image, and/or
for a plurality of personalized regions of interest of the first acquired image (A1), estimation of a local geometric transformation specific to the personalized region of interest, from fourth points of interest (P4A1) located in the personalized region of interest and the third points of interest (P3A2) with which these fourth points of interest (P4A1) have been matched, in which the second geometric transformation (TA1A2) is also estimated (E13) from the local geometric transformations specific to the personalized regions of interest of the first acquired image (A1).

10. The method according to claim 1, also comprising merging (E18) of results supplied from each analysis step.

11. The method according to claim 10, wherein the merging (E18) comprises authentication of the document, wherein authentication succeeds on condition that information is found during analysis of at least one of the acquired images (A1, A2, A3), and not found during analysis of at least one other of the acquired images (A1, A2, A3).

12. The method according to claim 11, wherein each analysis (E10, E15, E17) comprises recognition of characters, and in which merging (E18) comprises arbitration between the characters recognized during the analysis steps.

13. A computer program product comprising code instructions for executing an analysis method according to claim 1, when this program is executed by a processor.

14. A device for analyzing content of a deformable structured document, the device comprising a receiving interface for receiving a first image (A1) showing the document and a second image (A2) showing the document, and wherein the device further comprises an image-processing module (4) configured to:
match first points of interest (P1A1) extracted in the first acquired image (A1) with second points of interest (P2M2) of a first reference image (M1) showing a first model of the document,
estimate from a first geometric transformation (TM1A1) taking account of deformations of the structured document shown in the first acquired image relative to the first model, from the matches made in the preceding step,
determine at least one first region to be analyzed in the first acquired image (A1), by projection of at least one reference region of the first reference image by means of the first transformation (TM1A1),
analyze the content of the first determined region,
wherein the image-processing module (4) is further configured to:
match third points of interest (P3A2) extracted in the second acquired image (A2) with fourth points of interest (P4A1) extracted in the first acquired image (A1), estimate, from the matches made in the preceding step, a second geometric transformation (TA1A2) taking account of deformations of the document shown in the second acquired image (A2) relative to the document shown in the first acquired image (A1), estimate a third geometric transformation (TM1A2) taking account of deformations of the document shown in the second acquired image (A2) relative to the first model, wherein the third transformation is a composition of the first geometric transformation (TM1A1) and of the second geometric transformation (TA1A2), determine at least one second region to be analyzed in the second acquired image (A2) by projection of the reference region of the first reference image by means of the third geometric transformation, analyze the content of the second determined region.

15. A device for analyzing content of a deformable structured document, the device comprising a receiving interface for receiving a first image (A1) showing the document and a second image (A2) showing the document, and wherein the device further comprises an image processing module (4) configured to:

match first points of interest (P1A1) extracted in the first acquired image (A1) with second points of interest (P2M2) of a first reference image (M1) showing a first model of the document, estimate a first geometric transformation (TM1A1) taking account of deformations of the structured document shown in the first acquired image relative to the first model, from the matches made in the preceding step, determine at least one first region to be analyzed in the first acquired image (A1), by projection of at least one reference region of the first reference image by means of the first transformation (TM1A1), analyze the content of the first determined region, wherein the image-processing module (4) is further configured to:

match third points of interest (P3A2) extracted in the second acquired image (A2) with fourth points of interest (P4A1) extracted in the first acquired image (A1), estimate, from the matches made in the preceding step, a second geometric transformation (TA1A2) taking account of deformations of the document shown in the second acquired image (A2) relative to the document shown in the first acquired image (A1), match the fifth points of interest (P5A2) extracted in the second acquired image (A2) with sixth points of interest (P6M2) of a second reference image (M2) showing a second model of the document, estimate, from the matches made in the preceding step, a third geometric transformation (TM2A2) taking account of deformations of the document shown in the second acquired image (A2) relative to the second model, estimate a fourth geometric transformation (TM1A1') taking account of deformations of the document shown in the first acquired image (A1) relative to the first model, wherein the fourth transformation is a composition of the inverse (TA2A1) of the second transformation (TA1A2), of the third transformation (TM2A2), and of a fifth predetermined geometric transformation (TM1M2) taking account of deformations of the second model relative to the first model, determine at least one second region to be analyzed in the first acquired image (A1) by projection of the reference region of the first reference image by means of the fourth geometric transformation, analyze the content of the second determined region.

* * * * *